F. H. LANDRUM AND A. N. CRAMER.
STERILIZING APPARATUS.
APPLICATION FILED FEB. 21, 1917.

1,417,182.

Patented May 23, 1922.
3 SHEETS—SHEET 2.

Francis H. Landrum
Albert N. Cramer Inventor

By Edwin P. Corker

Attorney

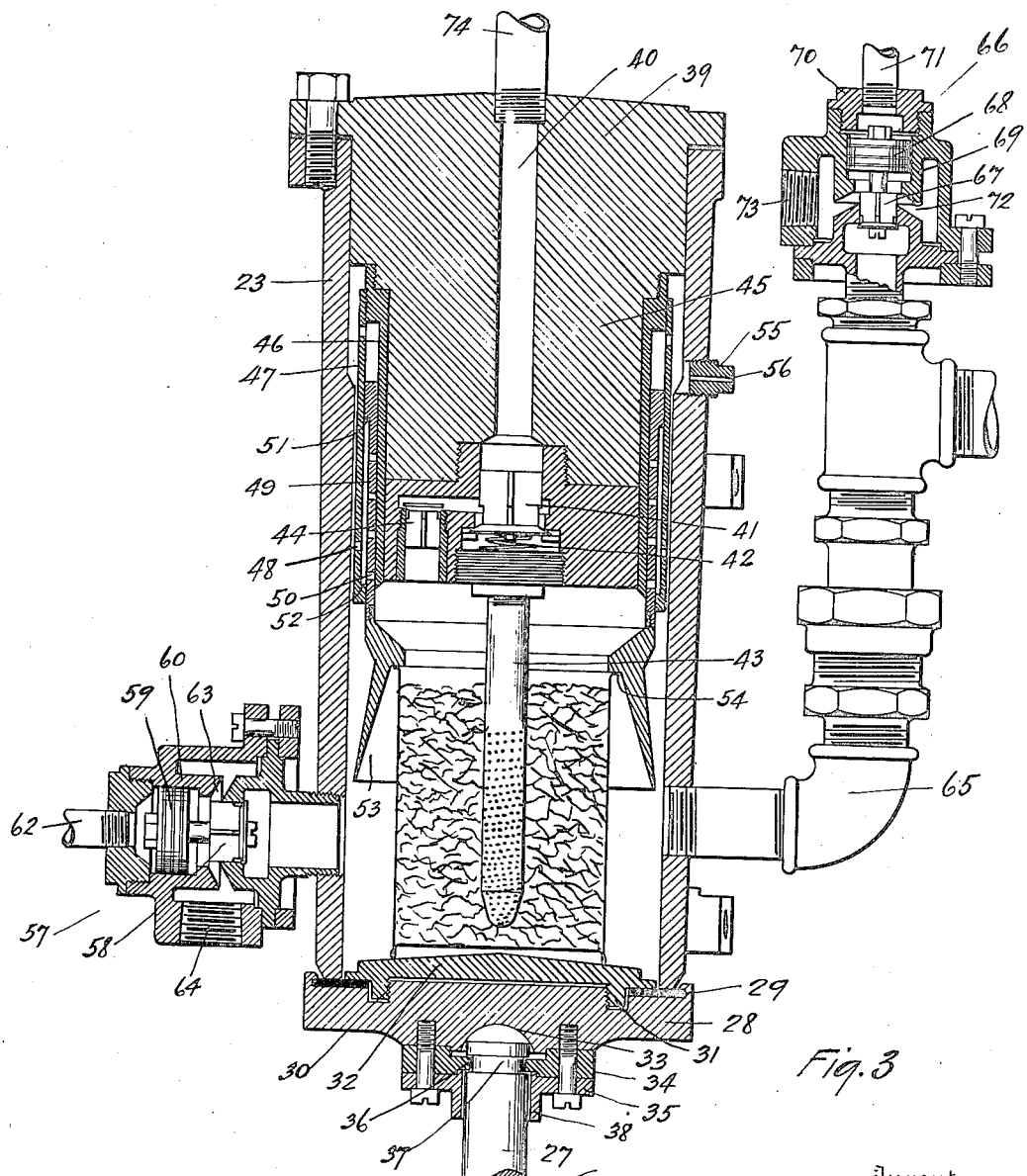

ated May 23, 1922.
UNITED STATES PATENT OFFICE.

FRANCIS H. LANDRUM AND ALBERT N. CRAMER, OF COLUMBUS, OHIO, ASSIGNORS TO THE WEDOIT COMPANY, OF COLUMBUS, OHIO.

STERILIZING APPARATUS.

1,417,182. Specification of Letters Patent. Patented May 23, 1922.

Application filed February 21, 1917. Serial No. 149,990.

*To all whom it may concern:*

Be it known that we, FRANCIS H. LANDRUM and ALBERT N. CRAMER, citizens of the United States of America, residing at Columbus, in the county of Franklin and State of Ohio, have invented certain new and useful Improvements in Sterilizing Apparatus, of which the following is a specification.

Our invention relates to sterilizing apparatus and has particular reference to an apparatus designed to receive a product for sterilization in open vessels, successively subject such vessels and their contents to a sterilizing fluid while open, and pass such open vessels onward towards closing mechanism.

One object of this invention is to provide a means for efficiently delivering a sterilizing fluid within and adjacent the base of each open vessel and to remove such fluid from a point or points above the upper surface of the product in each vessel. Then, our invention contemplates the surrounding of the open vessel with a preferably sterile fluid to resist the effects of the high pressure sterilizing fluid within the vessel, and we contemplate insuring a draft from within the vessel outwardly.

Preferably the sterilizing fluid will be introduced into the vessel and then percolate through the vessel engaging mechanism to the chamber about the exterior of the vessel. With our mechanism, this draft is particularly accentuated at the close of the treatment of each vessel, for we have provided means automatically effective to exhaust the pressure fluid from around each vessel more rapidly than the exhaust of the pressure fluid from within each vessel. The obvious result is that the sterilizing fluid within each vessel will move towards the exterior of the vessel, repelling contaminating particles which might otherwise tend to drift towards and settle within the vessel. In addition, we have provided a means for exhausting the line connecting the chamber exterior of the vessel to the valve casing. This means is so timed with relation to the exhausting of the interior of the vessel that it is, under preferred conditions, operated simultaneously with the means from the chamber exterior of the vessel. If, as is often the case, there is a slight leakage between the ports of the central valve, there may be a passage of fluid through this connecting line. The present means precludes such passage and diverts the fluid medium to the atmosphere. The danger is that this connecting line may contain contaminating material, forced into it at the initial injection of the treating medium into the vessel, from whence it has passed to the exterior of the vessel and then into the line referred to. This contaminating material may not have been rendered harmless and therefore it is undesirable that it be returned to the exterior of the vessel, as would be the case if the passage of the fluid medium from the valve member to the exterior of the vessel were not prevented.

It is further important that this line shall not contain fluid under pressure when the telescoping parts are extended with reference to the treating head. This telescoping member is perforated through its wall with a plurality of small openings, which openings are opposite the line connection to the chamber exterior of the vessel. Obviously, if this line contains contaminating material and a fluid under pressure, while the chamber exterior of the vessel, as well as the vessel and its contents, is relieved of its pressure, the draft of the fluid under pressure would be with considerable force against the wall of the telescoping parts and there would be great danger of this fluid having accumulated some of this contaminating material and depositing it through the perforations of the telescoping parts into the sterile product in the vessel.

Another feature of our invention relates to the particular manner of mounting the central valve of our apparatus. A further feature has to do with the receiver closers and the way in which they are mounted.

A feature of considerable importance in this improvement consists in the novel combination and structure of the feed wheels and conveyor chains for delivering and removing the vessels from the receiver closers of the machine.

The preferred embodiment of our invention is shown in the accompanying drawings, wherein similar characters of reference designate corresponding parts, and wherein—

Figure 3 is a vertical section of our preferred treating chamber and the parts preferably attached thereto.

Figure 1:
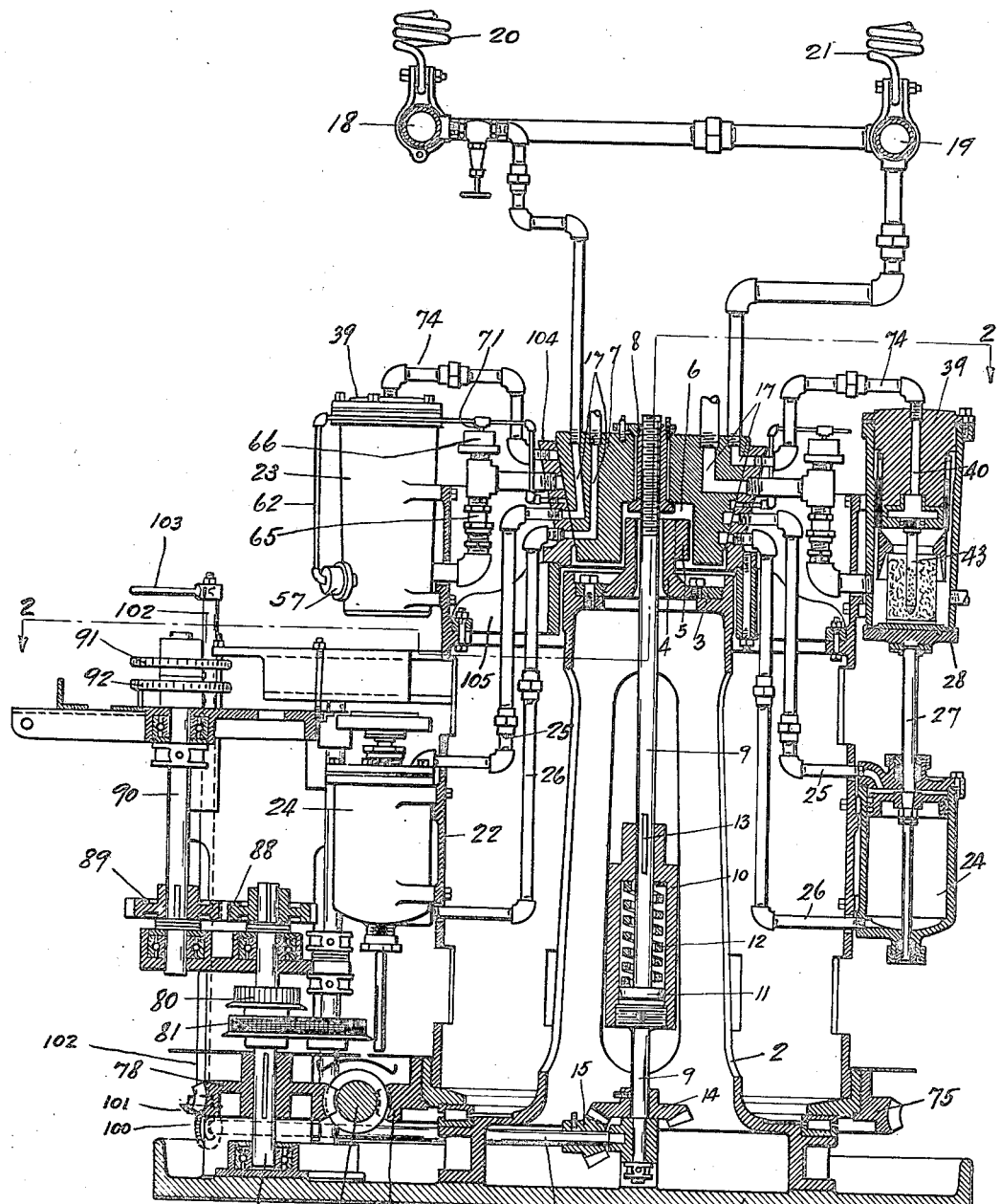
Figure 1 is a vertical section of our improved apparatus.
Figure 2:
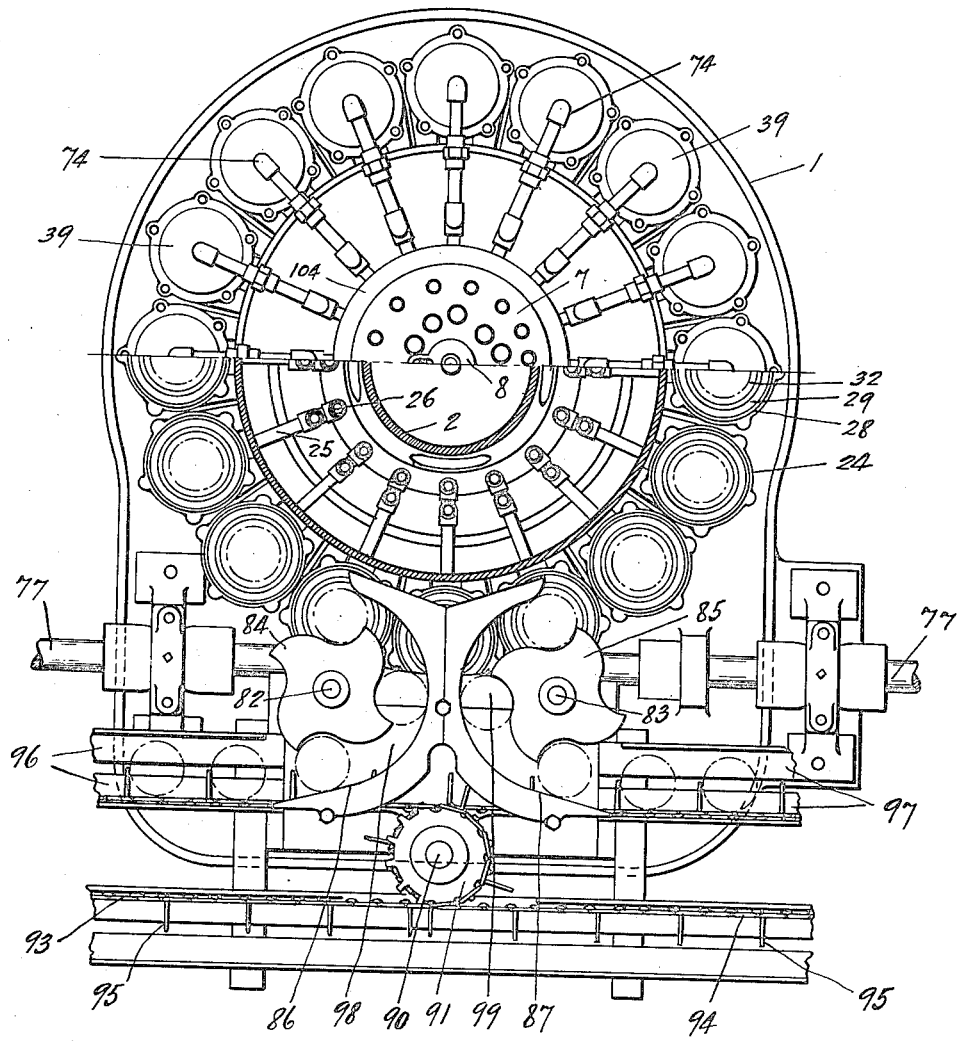
Figure 2 is a plan view of the machine broken away along the line 2—2 of Figure 1.

In the drawings, our improved apparatus comprises a base plate 1 carrying a hollow standard 2 which supports upon its upper end a plate 3 having a vertical sleeve-like extension 4, which extension carries radial key members 5. Each key member 5 extends into a groove 6 of a superimposed valve 7, which valve 7 is intended to be stationary. The valve is engaged through means of an internally threaded spool 8 by a vertical rod 9 which is adjustably threaded into this spool. The upper and lower flanges of this spool 8 are rounded to fit correspondingly rounded seats in the valve 7. This construction permits a slight movement of the valve on the spool to insure proper seating of the valve in its casing. The rod 9 is manually rotated in one direction or the other to raise or lower this valve. However, the rod 9 is broken intermediate its ends so that the valve may be resiliently held upon its seat. This intermediate structure comprises a spring housing 10 having a chamber within which fits a head 11 upon the base of the rod 9. Between the head 11 and the upper end of this chamber is mounted the coil spring 12 and this coil spring 12 constantly tends to prevent extension of the rod structure. The housing 10 is prevented from turning with relation to the rod 9 by a spline 13. The base of the rod 9 carries a beveled gear 14 which meshes with a second beveled gear 15 carried upon a shaft 16.

Upon the other end of this shaft 16 is provided another bevel gear 100 which meshes with a corresponding bevel gear 101 carried on the lower end of the vertical shaft 102. This shaft 102 is provided on its upper end with a ratchet handle 103, by which the shaft may be rotated to control the shaft 16. The ratcheted handle is so positioned that the operator of the apparatus may conveniently operate it, without undue delay. It is obvious that rotation of the shaft 102 through the shafts 16 and 9, will tend to raise or lower the central valve 7. If the central valve 7 is already lowered to seat in the casing 104, continued rotation of the shaft 16 in the direction tending to lower the valve will resiliently tension the valve in its seat in the casing.

This central valve 7 has a number of ports 17 into which the fluid (preferably steam under pressure) is designed to be introduced from or exhausted to manifolds 18 and 19. It is worthy of note that these manifolds 18 and 19 are supported by springs 20 and 21 which relieve the valve of any abnormal weight.

Preferably these springs 20 and 21 are tensioned to restrain the valve 7 from its seat in the valve casing 104, except when pulled there by the rotation of the shaft 9 as previously described.

The structure so far described is stationary and forms a support for a rotating drum structure 22 carrying a number of regularly spaced treating units. Each treating unit may be held to comprise a treating chamber 23 and a chamber closer 24. The chamber closer 24 comprises a cylinder within which is mounted a piston automatically operable by fluid under pressure through the pipes 25 and 26 connected with the valve casing 104. The piston rod may be designated 27 and as shown in Figure 3, carries a closer plate 28. The closer plate 28 is channeled for the reception of a rubber gasket 29 and has a threaded annular channel 30 within which is threaded a rim 31 of a vessel supporting plate 32. This vessel supporting plate 32 has a slightly conical upper surface to facilitate centering of the vessel. The plate 28 is universally mounted having a rounded socket 33 for the reception of the head of the piston rod 27. In addition, there are bolted to the plate 28 two superimposed washer members 34 and 35. The washer member 34 is split and has a central tongue 36 which extends loosely and with considerable clearance into a neck 37 in the piston rod 27. The washer member 35 has a sleeve 38 which is bored in a manner to afford a clearance between its surfaces and the piston rod 27. This permits a limited movement of the closer plate 28 upon the rod 27, and insures its proper alignment with the treating chamber.

The treating chamber 23, as best illustrated in Figure 3, has a closing head 39 bored as at 40, which bore leads to a valve 41 normally held closed by a spring 42 and into a perforated nozzle 43. Adjacent the valve 41, are a number of valves 44 operating in the opposite direction to permit the escape of fluid under pressure from the vessel into the bore 40 of the head 39. The head 39 is reduced as at 45 and supports a sleeve 46 which in turn supports a relatively spaced sleeve 47 having perforations therein as at 48. This outer sleeve 47 has a slight clearance with relation to the walls of the chamber 23 and the space between the sleeves 46 and 47 is occupied by a sliding sleeve member 49 having a plurality of perforations 50. This sleeve 49 is shouldered as at 51 so that this shoulder cooperates with the shoulder 52 of the outer sleeve 47, such cooperation limiting the downward movement of the sleeve 49. The lower extremity of this sleeve 49 is flared as at 53 and has a shoulder as at 54 to rest upon the vessel whose contents and interior are to be treated.

In operation, the vessel containing the product to be sterilized is placed upon the conical plate of the chamber closer and this chamber closer is elevated forcing the upper end of the vessel into the flaring structure 53. The flaring structure 53 automatically centers the vessel before the nozzle enters the product and with the continued elevation of the chamber closer raises the sliding sleeve member 49, until its perforations 50 are closed by the sleeves 46 and 47. Then steam is admitted through the nozzle into the interior of the vessel by way of the passage 40 and the valve 41, and percolates between the sliding sleeve member 49 and the spaced sleeve members 46 and 47 to the chamber exterior of the vessel.

The treating chamber 23 at its upper end is provided with an opening into which is threaded the plug 55 with a relatively small opening 56 to permit the escape of air and treating fluid from the exterior of the vessel, during the treatment of the vessel. This provides a continual circulation of the treating fluid from the nozzle, throughout the vessel and its exterior. Also it provides an escape for air which is highly resistant to sterilization by heat. This expulsion is rendered more thorough as it is continued even under the high pressure of the treating fluid.

Threaded into the exterior of the lower end of the treating chamber 23 is a valve member 57. This valve member 57 is provided with a valve 58 normally held closed by the pressure of the treating fluid within the treating chamber 23. Rigidly secured to the valve 58 is a piston 59 fitted to the bore of the cylinder 60. The cylinder 60 has a cap 61 threaded to receive a pipe 62 to supply or exhaust the fluid pressure operating upon the piston 59. Exterior of the seat of the valve 58 is an opening 63 communicatingly connected with the threaded opening 64 on the lower side of the cylinder 60. In operation, the steam is admitted to the treating chamber 23 causing the valve 58 to close, the pipe 62 being open to exhaust through the ports 17 of the central valve. When the port 17 of the central valve is positioned to supply fluid pressure to this pipe 62, the piston 59 being of greater area than the valve 58, the valve 58 is forced from its seat, and fluid pressure within the treating chamber 23 is permitted to escape through the passage 63 to the opening 64 and thence to the atmosphere. This action is so timed by the ports of the central valve 7 that it takes place simultaneously with the exhaust of the treating fluid from the interior of the vessel. As the exhaust through the valve 57 is obviously shorter than that through the central valve 7, and as there is less friction, this portion of the fluid pressure will be dissipated more rapidly through the valve 57, insuring a lower fluid pressure around the vessel than within. This insures a draft from the interior of the vessel toward the exterior. The initial influx of the treating fluid through the nozzle 43 carries large quantities of bacteria to the exterior of the vessel, and ofttimes the treatment at the exterior of the vessel is insufficient to destroy or render these bacteria harmless. If, therefore, the draft were to be reversed, it would carry such bacteria back into the vessel after such vessel had been completely sterilized.

The treating chamber 23 is further connected at its lower end with the pipe 65. This pipe line is connected with suitable fittings to the valve casing 104, and at its highest point is provided with a valve member 66. This valve member is of similar construction to that of the valve 57, comprising a valve 67 normally held closed by the fluid pressure in the pipe 65. Rigidly secured to the valve 67 is a piston 68 operable in the bore of the cylinder 69. The cylinder 69 is provided with a cap 70 threaded to receive the pipe 71 to supply or exhaust fluid pressure upon the end of the piston 68. Exterior of the seat of the valve 67 is an opening 72 communicatingly connected with the threaded opening 73 in the side of the cylinder 69. In operation, the steam in the treating chamber 23, exterior of the vessel being treated, enters the pipe 65 and seats the valve 67, the pipe 71, of the valve member 66 being connected to an exhaust port of the central valve. When the central valve is connected to supply fluid pressure to this pipe 71, the piston 68, being of greater area than the valve 67 forces the valve from its seat, and fluid pressure is permitted to pass from the pipe 65 to the atmosphere through the opening 72 and 73. If, as is often the case, there is a leakage of fluid pressure between the ports of the central valve 7, such pressure would tend to pass into the treating chamber 23. The line 65 having received the initial influx of treating medium for the initial injection into the vessel, usually contains contaminating material. By means of this valve 66 it is obvious that we have provided means to prevent the return of such contaminating material to the vessel after it has been sterilized. Such leakage between the ports of the central valve 7 may occur when the telescoping sleeve 49 is extended with reference to the treating head 39. Thus the openings 50 of this telescoping sleeve 49 would be positioned opposite the opening of the pipe 65 into the treating chamber 23. The sterile vessel containing the sterilized product would thus be in position to receive an infusion of this contaminating material. The valve 66 being positioned at the highest point in the line 65 and being opened to permit the hot fluid pressure to escape to the atmosphere effectually prevents such return of material from the pipe 65, but maintains a continual draft from the chamber exterior of the vessel to the atmosphere.

The valve casing 104 is bolted to and supported from the drum 22 by the bracket 105. The upper row of ports in this valve casing 104 is provided with a series of pipes 74, suitably connected with the bored hole 40 in the chamber treating head 39. These pipes supply and exhaust treating fluid from the ports 17 of the central valve 7, the position of the ports 17 regulating the time for such introduction and exhaust. The second row of ports of the valve casing 104 is connected with the lower end of the treating chamber 23 by means of the pipe 65, previously described, and provided with the valve 66. This pipe 65 is used to exhaust the fluid pressure from the chamber exterior to the vessel, such exhaust being simultaneous with the exhaust of the pipes 74 from the interior of the vessel. The third row of ports is connected with the pipes 62 and 71 of the valve members 57 and 66. These ports are connected to atmosphere at the time the vessel is being treated by the treating fluid. When such treating fluid is being exhausted from the interior and the exterior of the vessel through the central valve by means of the connecting pipes 65 and 74, this third row of ports receives an injection of the fluid pressure to operate the valves 57 and 66 as previously described. This fluid pressure is cut off previous to the beginning of the treating operation of another vessel. The fourth and fifth rows of ports are connected respectively by the pipes 25 and 26 to the operating cylinder 24 previously described. These pipes are under control of the ports 17 of the central valve and supply or exhaust fluid pressure to the proper end of the piston mounted in the cylinder 24. Thus, the receiver closer 28 is in depressed position, at the time of receipt of the vessel to be treated, and is elevated to seal the treating chamber 23, with the vessel therein, during the treatment. Upon completion of the treatment, the closure is depressed to permit the removal of the vessel and the insertion of another vessel to be treated.

On the lower end of the drum 22 is a worm gear 75, under subjection to the worm 76 of the shaft 77. This shaft may be suitably driven by means not shown. The drum 22 is thus rotated on the roller bearing 78 carrying the treating chambers 23 and their operating cylinders 24 about the stationary central valve 7.

The worm 76 also engages the worm wheel 78 secured to the shaft 79, causing it to rotate in the opposite direction from the drum 22. Secured to this shaft 79 are sprockets 80 and 81 for chain drives operating the shafts 82 and 83, mounted on the upper ends of which are the feed wheels 84 and 85 operating in conjunction with the guides 86 and 87. The feed wheel 84 operates in conjunction with the guide 86 to deposit the vessels on the vessel supporting plate 32. The feed wheel 85 with its guide 87 removes such vessels after their treatment. The shaft 79 is provided on its upper end with a spur gear 88 in engagement with a corresponding spur gear 89 secured to the shaft 90. This reverses the direction of rotation of the shaft 90 in relation to the shaft 79 and consequently it rotates in the same direction as the drum 22. Secured to the upper end of this shaft 90 are sprockets 91 and 92 for driving endless chains 93 and 94, which chains are positioned one over the other and have lateral attachments 95 equally spaced throughout their lengths. The vessel tracks 96, and 97 are provided with vertical extensions one of which engages the back of the chains 93 and 94 and thereby positions them, whereas the other provides a guide which retains the vessel in engagement with the lateral extensions 95 of the chains insuring uniform movement thereof. The top faces of these vessel tracks 96 and 97 are in alignment with the top of the plate 98. The plate 98 has secured to its rear edge a relatively thin plate 99, the top surface of which aligns with the top surface of the plate 98. This thin plate 99 is positioned above a portion of the closer plate 28, and on the feed-in side, where the vessel is under subjection to the feed wheel 84 the radial edge of this plate 99 is positioned even higher than the conical surface of the vessel supporting plate 32, this insures the smooth passage of the vessel from the plate 98 to the vessel supporting plate 32. On the take-off side where the vessel is under subjection to the feed wheel 85, this plate 99 has its radial edge lower than the conical surface of the vessel supporting plate 32 to permit an undisturbed transfer from the vessel supporting plate 32 to the plate 98. In operation, the vessels are engaged by the lateral attachments 95 of the continuously moving chain 93, and moved along the vessel track 96 to the guide 86, which is constructed to gradually release the vessels from the lateral attachments 95. Simultaneously the feed wheel, whose periphery is moving at a corresponding speed with the chain 93, engages the vessel in the pocket for its reception, carrying it across the plate 98 and the plate 99 and depositing it on the center of the registering vessel supporting plate 32. This vessel supporting plate is moving about the center of the drum 22 at a corresponding speed to the periphery of the feed wheel 84. The feed wheel 84 retains control of the vessel until the periphery of the feed wheel is tangent to the arc of travel of the center of the vessel supporting plate 32, at which time the vessel supporting plate 32 assumes control and carries the vessel into its arc of travel. This travel is about the valve 7, which supplies the fluid treating agent and the fluid operating pressure as previously described, and the travel continues until the vessel is brought to engagement with the guide 87 at which time the feed wheel 85 embraces it in one of the pockets provided. The vessel is now carried by the feed wheel over the plate 99 and thence over the plate 98 and deposits it in front of one of the lateral attachments 95 of the chain 94. This chain then carries the vessel over the vessel track 97 away from the apparatus.

What we claim is:

1. Sterilizing apparatus comprising means for injecting a sterilizing agent into the material in an open vessel, and means for permitting such sterilizing agent to escape to the atmosphere during treatment, said means constructed to retain liquids in the vessel.

2. Sterilizing apparatus comprising means for injecting a sterilizing agent into the material in an open vessel, and means for permitting such sterilizing agent to escape to the atmosphere during treatment from the vessel, said last means operating from above the material in the vessel.

3. Sterilizing apparatus comprising means for injecting a sterilizing agent into the material in an open vessel at or near its base, and means for permitting such sterilizing agent to escape to the atmosphere during treatment from the vessel, said last means being positioned above the material in the vessel.

4. Sterilizing apparatus comprising a conductor for injecting and exhausting a pressure sterilizing agent into and from material in an open vessel, means for maintaining such sterilizing agent under pressure about such material, said conductor being constructed to permit the sterilizing agent to enter the material near its base and to escape from above the material to the atmosphere during treatment.

5. Sterilizing apparatus comprising a treating chamber to inclose the vessel containing the material to be treated, means within such treating chamber to engage the open end of the vessel, means for introducing a sterilizing agent into and around the vessel, and means to maintain a draft of the sterilizing agent from the interior of the vessel toward its exterior.

6. Sterilizing apparatus comprising means for engaging the open end of a vessel containing material to be treated, means for introducing a sterilizing agent into such material in the vessel, and means to maintain a draft of such sterilizing agent from the interior of the vessel toward the exterior.

7. Sterilizing apparatus comprising a treating chamber to enclose an open vessel to be treated, means for introducing a sterilizing agent into and around the vessel, means for permitting the escape of the sterilizing agent from within the vessel, and means for permitting the escape of the sterilizing agent from around the vessel, said last means permitting a more rapid escape than said second means.

8. Sterilizing apparatus comprising a treating chamber for inclosing an open vessel to be treated, means for introducing a pressure sterilizing agent into the vessel, means for surrounding the vessel with a balancing fluid pressure, means for permitting the escape of said sterilizing agent, simultaneously operating means for permitting the escape of the balancing fluid pressure, said last means permitting a more rapid dissipation of the balancing fluid pressure than said third means permits of the sterilizing agent.

9. Sterilizing apparatus comprising a treating chamber for inclosing an open vessel during treatment, means for introducing a sterilizing agent into such chamber, a conductor for permitting such sterilizing agent to escape from said treating chamber, said conductor provided with means for resisting passage of fluid pressure towards said treating chamber during or after such escape.

10. Sterilizing apparatus comprising a treating chamber for inclosing an open vessel containing material to be treated, means for introducing a sterilizing agent into such a chamber, a conductor provided to permit the escape of said treating agent from the treating chamber, said conductor provided with an automatically operated valve, an automatically operated valve in said treating chamber, said valves operating simultaneously.

11. Sterilizing apparatus comprising a main supply valve and its casing, a treating chamber connected with said casing by a conductor, means for introducing a sterilizing agent into said treating chamber, and means for permitting the escape of said treating agent from the treating chamber, said conductor provided with means for preventing leakage of pressure from the ports of the main central valve passing through said conductor to the treating chamber after the initiation of said exhaust.

12. Sterilizing apparatus comprising a treating chamber for inclosing an open vessel containing the material to be treated, an extendable perforated telescopic sleeve engaging the open end of said vessel, a conductor connected to said treating chamber opposite the extended telescopic perforated sleeve, and means for preventing passage of contaminating material from said conductor through said perforated sleeve.

13. Sterilizing apparatus comprising a main supply valve and its casing having relative rotary movement with each other, and means for resiliently supporting said valve.

14. Sterilizing apparatus comprising a main supply valve and its casing having relative rotary movement with each other, resilient means for supporting said valve, and resilient means for forcing said valve to its seat in the casing.

15. Sterilizing apparatus comprising a main supply valve and its casing, means for preventing rotation of the valve, means for causing its casing to rotate, and means for resiliently maintaining the valve in its seat in the casing.

16. Sterilizing apparatus comprising a plurality of vessel supporting plates rotating about its center, feeding means rotating about positioned centers for feeding vessels to and from the vessel supporting plates, said feeding means so constructed that their peripheries are tangent with the arc of travel of the centers of the vessel supporting plates.

17. Sterilizing apparatus comprising a plurality of vessel supporting plates rotating about its center, feeding means rotating about positioned centers for feeding vessels to and from the vessel supporting plates, said feeding means timed that the speed of travel of their peripheries is the same as the speed of travel of the center of the vessel supporting plates about the center of the apparatus.

18. Sterilizing apparatus comprising a plurality of vessel supporting plates rotating about its center, feeding means rotating about a positioned center for feeding vessels to the vessel supporting plates, a plate positioned beneath said feeding means to support the vessels, said plate elevated above said vessel supporting plates to insure transfer thereto.

19. Sterilizing apparatus comprising a plurality of vessel supporting plates rotating about its center, feeding means rotating about a positioned center for removing vessels from the vessel supporting plates, a plate positioned beneath said feeding means to support the vessels, said plate depressed below the upper surface of said vessel supporting plates to insure transfer therefrom.

20. Sterilizing apparatus comprising a plurality of vessel supporting plates rotating about its center, feeding means rotating about positioned centers for feeding the vessels to and from the vessel supporting plates, a plate positioned beneath said feeding means to support the vessels, said plate elevated above said vessel supporting plates on the inlet and depressed below the top surface of said vessel supporting plates on the outlet to insure passage of said vessels.

21. Sterilizing apparatus comprising a plurality of vessel supporting plates mounted on closer plates and rotating about the center of the apparatus, feeding means rotating about positioned centers for feeding vessels to and from the vessel supporting plates, a plate positioned beneath said feeding means to support the vessels, said plate positioned over the passing closer plates, and elevated on the feed-in side above the top surface of the vessel supporting plates and depressed on the removal side below the top surface of the said vessel supporting plates to insure passage of said vessels.

22. Sterilizing apparatus comprising feeding means for feeding vessels to vessel supporting plates, and means for passing vessels to said feeding means, said means constructed to uniformly space said vessels for presentation to the feeding means.

23. Sterilizing apparatus comprising feeding means for feeding vessels to and from vessel supporting plates, means for passing vessels to and from said feeding means, said last means having a plurality of laterally spaced attachments for engaging the vessels to move them.

24. Sterilizing apparatus comprising a vessel supporting plate, and means for centering a vessel thereon, said means operable throughout the circumference of such vessel.

25. Sterilizing apparatus comprising a vessel supporting plate, said plate having a slightly conical upper side to facilitate centering a vessel thereon.

26. Sterilizing apparatus comprising a closer plate, and a treating chamber constructed to be closed by said closer plate, means for mounting said closer plate to automatically permit alignment with said treating chamber.

27. Sterilizing apparatus comprising a treating chamber and a closer plate to close the open end of said treating chamber, means for universally mounting said closer plate to permit alignment with said treating chamber, and means limiting the universal mounting of said closer plate.

28. Sterilizing apparatus comprising a treating chamber, and means in said treating chamber to permit passage of air to the atmosphere, said means being a relatively small opening with its delivery non-downwardly directed.

29. Sterilizing apparatus comprising a treating chamber, said chamber being provided with a non-downwardly directed relatively small opening to permit passage of fluid.

30. Sterilizing apparatus comprising a treating chamber, means for introducing a sterilizing agent into said treating chamber, and non-downwardly directed means for permitting a continual circulation of the treating agent from the treating chamber through a relatively minute opening.

31. Sterilizing apparatus comprising a treating chamber, and means for introducing a sterilizing agent into said treating chamber, means for maintaining said treating agent under pressure in said treating chamber, and non-downwardly directed means for permitting a continual flow of treating agent from said treating chamber through a relatively minute opening.

In testimony whereof we, hereby affix our signatures.

FRANCIS H. LANDRUM.
ALBERT N. CRAMER.